July 24, 1962     W. S. ATTWOOD     3,045,787
STRIP MADE OF ELASTIC DEFORMABLE MATERIAL FOR
CONNECTING TWO PARTS IN EDGE-TO-EDGE RELATION
Filed Dec. 8, 1959

Inventor
William Spencer Attwood
By John F. Marvin
Attorney

United States Patent Office 3,045,787
Patented July 24, 1962

3,045,787
STRIP MADE OF ELASTIC DEFORMABLE MATERIAL FOR CONNECTING TWO PARTS IN EDGE-TO-EDGE RELATION
William Spencer Attwood, St. Albans, England, assignor to General Motors Corporation, Detroit, Mich., a corporation of Delaware
Filed Dec. 8, 1959, Ser. No. 858,275
Claims priority, application Great Britain Feb. 14, 1959
2 Claims. (Cl. 189—78)

This invention relates to strips made of elastic deformable material for connecting two parts, such as panels, in edge-to-edge relation.

Such strips are useful, for example, as glazing strips for mounting a pane of glass in an opening of a sheet metal panel; such as in the case of windows or windscreens of motor vehicles, which require to be mounted in an opening of a sheet metal panel.

By the present invention, strips may be made which, though they may have other uses, are useful for mounting curved panes of glass such as those which are at present used for windscreens or rear windows of motor vehicles.

The present invention consists in a strip made of elastic deformable material, for connecting two parts in edge-to-edge relation, having a pair of channels which are able to receive the adjoining edges of the parts and are shaped so that the lips bounding the channels are stressed by the insertion of the edges of the parts so that the lips grip those edges; and having also an additional lip which, like the other lips, springs from the centre of the strip, and which, when the edges are in the channels, presses its tip against the nearest channel-bounding lip and reinforces the pressure of the elastic material against the edges.

The scope of the invention is defined by the appended claims; how the invention may be performed is particularly described below with reference to the accompanying drawings, in which:

Figure 1:
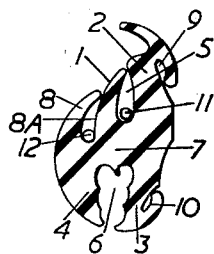
FIGURE 1 is a cross-sectional view of a strip in unstressed condition.
Figure 2:
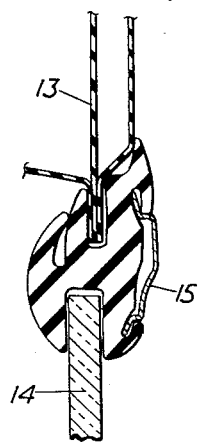
FIGURE 2 shows the same strip in the stressed condition when it is actually mounting a glass pane.

Referring to FIGURE 1, the strip, considered in section as shown, comprises a central portion 7 from which spring four lips 1, 2, 3, and 4. The lips 1 and 2 bound a channel 5 for receiving the edge of an opening in a sheet metal panel of a vehicle body, while the lips 3 and 4 bound a somewhat wider channel 6 for receiving the edge of a glass pane. Next to the lip 1 which bounds one side of the metal-receiving channel 5 is a fifth lip 8, called the reinforcer lip. This projects in the same general direction as the lip 1 though curved somewhat towards it, being separated at the root by a space 8A sufficient to receive an assembly cord as described below. The tip of the reinforcer lip 8 touches, or very nearly touches, the lip 1 when the strip is in unstressed condition. The reinforcer lip 8 presses its tip against the channel-bounding lip 1 as shown in FIGURE 2 when the glass 14 has its edge lodged in channel 6 and the glass and strip assembly is mounted in the opening made in the sheet metal panel 13, which is of double thickness. However, the reinforcer lip 8 is at its base separated from the lip 1 by a space sufficient to receive an assembly cord 12, a similar cord 11 being inserted in the channel 5 when fitting the glass into the body opening.

On the side opposite the reinforcer lip 8 the strip is undercut by slits 9, 10 in which may be lodged the edges of a decorative metal moulding 15 shown in FIGURE 2, and which, when the strip and the window glass have been fixed in position, faces the outside of the vehicle.

The use of the assembly cords 11, 12 is as follows. In the mounting of a glass pane 14 it is convenient first to apply the strip round the edges of the glass, and then to insert the glass (with the strip attached) into the opening in the metal. To get the metal edge lodged in channel 5 the lips 1 and 8 must be retracted. This may be done by previously laying a cord 11 along the base of the metal-receiver channel 5 so that the two ends of the cord are left loosely projecting; after which, by grasping one end of the cord and pulling it, the lips 1 and 8 are progressively retracted by the cord as it is pulled out of the channel 5. While pulling the cord the strip is pressed against the metal edge, inserting this into the channel 5 before the retracted lips 1 and 8 spring back. Alternatively two cords may be used, the cord 11 inserted in the metal receiver channel 5 and a cord 12 in the space 8A separating the base of the lip 8 from the lip 1, and then pulling simultaneously on both cords 11 and 12.

The strip is not used with a flexible wedging or buttressing member which, whether attached to the main body of the strip or forming a strip separated therefrom, may be interlocked with an undercut formation in the main strip so as to stress the rubber and increase the grip on the metal and glass edges. The lips 1, 2, 3, 4 bounding the channels are shaped so that by the insertion of the edges of the panels (glass and metal) those lips are sufficiently stressed to grip them, aided by the reinforcing action of the lip 8. When the edges are seated in the channels 5, 6, the resultant stressing of the rubber causes the reinforcer lip to press its tip against the lip 1, thus reinforcing the pressure of the rubber material against the edges of the parts 13, 14. However, the use of wedging or buttressing strips to provide an additional stressing of the rubber is quite feasible with strips according to the present invention.

I claim:

1. A glazing strip means useful for curved mounting of a window pane member in an opening of a sheet metal vehicle panel member, consisting only of a body of longitudinally extending elastomeric material having a solid wedge-free central portion, dual pairs of lip portions integral at a root end thereof with said central portion and each pair having laterally outwardly extending tapered free ends that define a pair of opposite grooves therebetween into which the pane and panel members fit, a first assembly cord fitted into specifically between one pair of lip portions defining one of these grooves to receive one of the members, said first cord being used specifically for spreading apart one of the pair of lip portions to aid in insertion and fit of one of the members into that one groove, and an additional assembly cord as well as a reinforcer lip means having a root end thereof also integral directly with said central portion to form an additional groove in which said additional cord fits in a location longitudinally adjacent to the root end of said one lip portion such that said additional cord can effect simultaneous spread of said lip means also in a direction coinciding with the spread of one of said lip portions by said first assembly cord, said reinforcer lip means specifically at a free end thereof abutting directly against a substantially outer end of said adjacent lip portion that holds one of the members directly in one of the grooves.

2. On a glazing strip means including a wedge-free body of longitudinally extending elastomeric material having one side undercut to form slits for reception of edges of a decorative molding and having dual pairs of lip portions each provided with laterally outwardly extending tapered free ends projecting integrally therefrom to define a pair of opposite longitudinally extending channels to receive adjoining edges of glass and sheet metal members, the improvement therewith which comprises a first assembly cord fitted specifically between one pair of lip portions defining one of the channels to receive one of the members subsequent to fitting of the body to the other of the members, said first cord being used specifically for spreading apart one of the dual pairs of lip portions to aid in insertion and fit of the one of the members into that one channel, a reinforcer lip means having a root end thereof integral directly with the body to form an extra groove in a location longitudinally adjacent to one lip portion defining that channel in which said first assembly cord is fitted, and an additional assembly cord longitudinally fitted into said extra groove and secondarily effective for simultaneous spreading of said lip means also in a direction coinciding with that of the spread of one of said lip portions by said first assembly cord, said lip portions in pairs directly engaging said members sealingly while said reinforcer lip means specifically engages only the outer tapered end of the lip portion spreadable by said first assembly cord, said reinforcer lip means being located specifically on a side of the wedge-free body opposite to the undercut for slits and pressing laterally against said one lip portion at the outer tapered end thereof to reinforce locking and sealing engagement of said one lip portion specifically against one of the members to fit in one of the channels of the wedge-free body.

References Cited in the file of this patent

UNITED STATES PATENTS

| | | |
|---|---|---|
| 2,093,614 | Lynch | Sept. 21, 1937 |
| 2,556,775 | Oswald | June 12, 1951 |
| 2,683,905 | Beck | July 20, 1954 |